United States Patent [19]

Inoue et al.

[11] Patent Number: 4,485,143
[45] Date of Patent: Nov. 27, 1984

[54] SILICON CARBIDE MATERIAL FOR LOW-MELTING POINT FUSION METAL

[75] Inventors: Susumu Inoue, Tokyo; Isao Sakashita, Yamagata; Kazunori Meguro, Yamagata; Kunio Hamaguchi, Yamagata, all of Japan

[73] Assignee: Toshiba Ceramics, Co., Ltd., Japan

[21] Appl. No.: 390,135

[22] Filed: Jun. 18, 1982

[30] Foreign Application Priority Data

Jun. 22, 1981 [JP] Japan .................................. 56-96336
Jun. 22, 1981 [JP] Japan .................................. 56-96340

[51] Int. Cl.$^3$ ............................................. B32B 15/00
[52] U.S. Cl. .................................... 428/334; 428/446; 428/450
[58] Field of Search .................... 428/446, 450, 334

[56] References Cited

U.S. PATENT DOCUMENTS

| | | | |
|---|---|---|---|
| 3,911,188 | 10/1975 | Torti et al. | 428/446 |
| 4,187,344 | 2/1980 | Fredriksson | 428/446 |
| 4,288,495 | 9/1981 | Terner et al. | 428/446 |

Primary Examiner—Marion E. McCamish
Assistant Examiner—E. Rollins Buffalow
Attorney, Agent, or Firm—Eric P. Schellin

[57] ABSTRACT

A silicon carbide material for low-melting point fusion metal composed of recrystallization silicon carbide or silicon nitride coupled silicon carbide and containing free silicon and silicon oxide in a total amount of 5% by weight or below. More preferably, the silicon carbide material is formed on the surface with a film of vapor phase growth silicon carbide or silicon nitride, and on this film or in place of this film silicon nitride and/or boron nitride is coated.

8 Claims, No Drawings

SILICON CARBIDE MATERIAL FOR LOW-MELTING POINT FUSION METAL

BACKGROUND OF THE INVENTION

1. Field of the Invention

This invention relates to silicon carbide material used in immersed heater protection tubes used in smelting furnace for low-melting point metals such as aluminum, lead etc. and furnaces for holding these molten metals, temperature sensor protection tubes, tubes for gas blow-out operation, furnace liner materials and so on.

2. Description of the Prior Art

Hitherto, the heating of low-melting metals such as aluminum and lead for fusion, and holding these molten metals has been carried out by fusion or from the outer side of the smelting or molding bath. Recently, however, extensive use is made of a system, in which a heater is accommodated in a protective tube and immersed in the metal.

Hitherto, use has been made of cast iron formed with a protective film or sintered bodies of silicon carbide or graphite. The internal heating system, in which heating is carried out by accommodating such a material as mentioned above and immersed in the metal, has a very superior thermal efficiency to the conventional external heating system. On the demerit side, however, since the aforementioned material is used in direct contact with the molten, it is liable to be attacked by the molten or an oxidation prevention agent floating on the molten surface. Further, the heat spalling is not always satisfactory, and long life cannot be expected.

The aforementioned materials are also used as temperature sensor protection tubes, operating tubes and other materials dealing with low-melting point fusion metals but presents similar problems.

Further, there are frequent occasions in which it is necessary to immerse these materials in the molten and take them out thereof. In such a case, formation of cracks or detachment of the protective film is prone due to a sudden temperature change.

SUMMARY OF THE INVENTION

An object of the present invention is to provide a silicon carbide material for low-melting point fusion metals, which is superior in corrosion resistance and thermal resistance, is free from generation of cracks, has long life and can be easily maintained.

Another object of the present invention is to provide a silicon carbide material for low-melting point fusion metals, which is free from generation of noise and from generation of dust.

The silicon carbide material for low-melting point fusion metals according to the present invention is characterized in that it contains free silicon and silicon oxide in a total amount of up to 5% by weight.

In a preferred mode of the silicon carbide material according to the present invention, the material is composed of recrystallization silicon carbide or silicon-nitride-bond silicon carbide material.

In another preferred mode of the silicon carbide material according to the present invention, the material is provided at least on a portion to be in direct contact with the fused metal with a vapor phase growth silicon carbide or silicon nitride film, the thickness of the film being preferably 0.1 to 2 mm.

In a further preferred mode of the silicon carbide material according to the present invention, after the formation of the vapor phase growth film on the material or without forming any vapor phase growth film the portion of the material to be in direct contact with the fused metal is provided with a corrosion-resisting adiabatic coating of silicon nitride and/or boron nitride. The coating layer preferably consists of two or more layers, and its thickness ranges from 0.3 to 3.5 mm.

DETAILED DESCRIPTION OF THE PREFERRED EMBODIMENT

A first feature of the silicon carbide material according to the present invention reside in that it is a recrystallization (i.e., self-bond) or silicon-nitride-bond silicon carbide material. More particularly, the material according to the present invention, in the former case, unlike the conventional silicon carbide sintered body which is obtained by sintering the mixture of silicon carbide powder and an inorganic binder, is formed by adding carbon to silicon carbide powder, heating the mixture and contacting it with silicon monoxide gas to bind the silicon carbide powder with the produced recrystallization silicon carbide. In the latter case, silicon nitride is produced during sintering by supplying a silicon source such as silicon tetrachloride or silicon trichloride and a nitrogen source such as ammonia or nitrogen, thus binding the silicon carbide powder with the silicon nitride thus produced.

However, when such silicon carbide molding is prepared, it is liable to contain residual free silicon or silicon oxide. Since these contents are present even in the raw material powder and are also liable to be produced during preparation, the total amount of $SiO_2$ and $Si$ is in some cases as high as 15%.

The inventors have studied the process of attacking of the silicon carbide molding by contacting it with fused aluminum and found that the presence of the free silicon and silicon oxide promote the corrosion, peel-off and reactions. As a result of study made on the relation between the content of $SiO_2$ and $Si$ and extent of corrosion with moldings which contain $SiO_2$ and $Si$ in small amounts or from which these components are removed, it is found those which contain $SiO_2$ and $Si$ in a total amount of 5% by weight or below have superior corrosion resistance. Silicon carbide is difficultly wetted by fused metal and has comparatively superior corrosion resistance. However, when it is molded, it is difficult to prevent intrusion of the other components, and this portion is corroded to have adverse effects upon on the life of the molding itself.

The inventors have succeeded in protecting the surface of the silicon carbide molding to extend the life thereof by forming a vapor phase growth silicon nitride or silicon nitride cover. Usually, the silicon carbide molding has a porosity of 15 to 25% though it is sintered after high pressure molding. However, the apparent surface porosity can be extremely reduced by the vapor phase growth of silicon carbide or silicon nitride. Further, in order to obtain sufficient effect, a thickness of 0.1 mm is necessary. If the thickness exceeds 2 mm, peel-off is prone even if the vapor phase growth material is the same silicon carbide as the substrate although it depends upon the molding conditions. For this reason, the thickness of the vapor phase growth film is preferably 0.1 to 2 mm.

When a silicon carbide material such as silicon-nitride-bond silicon carbide or self-bond silicon carbide is used as a protective tube, microcracks are produced with sudden temperature changes due to residual thermal strain produced in the manufacturing process, and the growth of these microcracks gives rise to instability of the life period. The maximum value of the temperature change that can be withstood by the material is generally expressed by an equation $$\Delta T = \frac{\sigma f(1 - \nu)}{E\alpha}$$

where $\Delta T$ is the maximum value of the temperature change, $\sigma f$ is the average fracture coefficient, $\nu$ is the Piosson ratio, $E$ is the Young's modulus and $\alpha$ is the coefficient of thermal expansion.

This value is substantially fixed with a given material, and in order to prevent the thermal shock rupture of the material it is necessary to hold the internal temperature difference to within $\Delta T$. To this end, it is effective to delay the surface temperature rise rate of the material. Further, when the silicon carbide material molding is subjected to a sudden temperature change, for instance by immersing it in a mold or taking out it therefrom, cracks are generated as mentioned earlier. Also, when a vapor phase growth film is formed, it is liable to be separated.

The present invention is predicated in a finding that in order to alleviate the surface temperature change of the silicon carbide material it is effective to provide a silicon carbide material or a silicon carbide material with a vapor phase growth film with a coating layer of silicon nitride and boron nitride as a material which is excellent as a heat insulating material and is not attacked by a low-melting point metal or an anti-oxidation agent with respect thereto and also from the considerations of the difference of the coefficient of thermal expansion with respect to the silicon carbide material. It is made apparent that the intended effect can be enhanced by providing a multi-layer structure consisting of two or more layers as the coating layer.

This is thought to be so in that a boundary face between two adjacent layers has an effect of blocking melt introducing into the coating layer, thus causing a great delay of the intrusion of the molten into the internal coating layers.

The coating is effected by adding an inorganic binder such as aluminum phosphate to silicon nitride or boron nitride powder, converting the mixture into a form of slip and coating the slip by blowing or immersion. If the coating layer has a thickness in excess of 3.5 mm, its mechanical strength is insufficient, so that its peel-off is prone. On the other hand, if its thickness is less than 0.3 mm, the heat isolation effect cannot be expected. Thus, a preferred thickness range is between 0.3 and 3.5 mm.

Examples of the silicon carbide material according to the present invention will now be given and described in comparison with comparison examples.

EXAMPLES 1, 2 and 3

A recrystallization silicon carbide material (Example 1) and silicon-nitride-bond silicon carbide material (Examples 2 and 3) according to the present invention were used to form heater protection tubes with a thickness of 7 mm, and these tubes were held immersed in aluminum molten at 700° C. for 30 days. After 30 days the heater protection tubes were taken out from the molten, and their section is observed and the extent of intrusion of aluminum into the heater protection tube was measured. The composition of the heater protection tubes and the measured depth of aluminum intrusion into these tubes are shown in Table 1 below.

COMPARISON EXAMPLES 1, 2 and 3

Heater protection tubes of silicon-nitride-bond silicon carbide materials outside the composition range according to the present invention ($Si + SiO_2 \leq 5\%$ by weight) and having the same shape as the Examples 1 to 3 were immersed in aluminum molten in the same manner as in the Examples 1 to 3, and the depth of intrusion of aluminum into the protection tubes was measured. The results are shown together with the Examples 1 to 3 in Table 1.

TABLE 1

| Example No. | Composition (% by weight) | | | Depth of intrusion (mm) |
|---|---|---|---|---|
| | SiC | Si₃N₄ | SiO₂ + Si | |
| Example 1 | 99.5 | 0 | 0.2 | 1.0 |
| Example 2 | 88.0 | 8.0 | 2.5 | 1.5 |
| Example 3 | 77.0 | 17.0 | 5.0 | 1.7 |
| Comparison example 1 | 73.0 | 20.0 | 6.1 | 6.8 |
| Comparison example 2 | 64.0 | 27.0 | 8.0 | 7.0 |
| Comparison example 3 | 46.0 | 40.0 | 12.5 | reaching of inner surface |

As is seen from Table 1, with the heat protection tubes according to the present invention the aluminum intrusion depth is merely less than 2 mm, whereas with the heater protection tubes outside the range according to the present invention the intrusion depth exceeds 5 mm. With the composition with $SiO_2 + Si$ exceeding 10% by weight, the intrusion depth reaches the inner surface of the protection tube.

EXAMPLES 4 to 9

Silicon carbide films of various thicknesses were formed by the vapor phase growth method on the surface of the recrystallization silicon carbide heater protection tube with the same $SiO_2 + Si$ content of 0.2% by weight as in the Example 1 and immersed in aluminum molten under the same conditions as in the Examples 1 to 3, and days until aluminum reaches the inner surface of the protection tube are shown in Table 2.

TABLE 2

| Example No. | Thickness of vapor phase growth film (μ) | Number of days until reaching of inner surface |
|---|---|---|
| 4 | 0 | 92 |
| 5 | 80 | 95 |
| 6* | 100 | 210 |
| 7* | 1020 | 260 |
| 8* | 1900 | 300 |
| 9 | 2100 | 190 |

The protection tube of Example 4 is the same as the protection tube of Example 1. The examples marked with * in Table 2, i.e., the Examples 6 to 8, fall in the range between 0.1 and 2 mm in a preferred mode of the present invention. As is apparent from Table 2, by setting the vapor phase growth film thickness to be between 0.1 and 2 mm, the instruction of aluminum into the protection tube can be extremely reduced. If the film thickness is less than 0.1 mm, no substantial effect can be obtained. If the thickness exceeds 2 mm, on the other hand, the number of days until the reaching of the inner surface is reduced.

EXAMPLES 10 to 13

The same heater protection tube as that used in Example 1 and those which were obtained by providing various coating layers on this tube were repeatedly immersed in and taken out of aluminum molten held at 740° C. in a holding furnace, and their life was measured. The coating material was prepared by adding aluminum phosphate as binder and water to the coating material powder and kneading the mixture into a paste. The paste thus obtained was coated, dried and sintered. The protection tubes were immersed in and taken out of aluminum molten three times a day at a speed of 30 seconds for reach time of immersion and taking-out. Table 3 shows the number of lifetime days of the protection tubes.

TABLE 3

| Example No. | Coating material | Number of lifetime days |
|---|---|---|
| 10 | None | 10-15 |
| 11* | Silicon nitride | 60-65 |
| 12* | Boron nitride | 90-100 |
| 13 | Alumina oxide | 20-25 |

As is apparent from Table 3, by providing a coating of the heat insulating material, the thermal shock on the protection tube at the time when the tube is immersed into and taken out of the molten is alleviated to extend the number of lifetime days. Particularly, the number of lifetime days is extended with Examples 11 and 12 (marked * using silicon nitride and boron nitride as the preferred coating material according to the present invention.

EXAMPLE 14

The same heater protection tube as those Examples 11 to 13 except for that the coating layer was formed as the following two-layer structure, and the lifetime was measured. The first coating layer was formed as a silicon nitride layer with a thickness of 0.7 mm, and the second coating layer was formed as a boron nitride layer with a thickness of 0.7 mm. As a result of repeated immersion and taking-out of the tube with respect to aluminum molten, the second layer was peeled-off after 60 to 65 days. When boron nitride was coated again on the system, the second layer was peeled-off after 50 to 60 days of use.

The commercially available silicon nitride powder and boron nitride powder contains such impurities as $SiO_2$, Si and $B_2O_3$. These components are richly reactive, so they may be removed or reduced through a refinement process to obtain a coating material having increased durability. Tests with respect to the film thickness were also made. In cases where boron nitride was used, the peel-off resulted in 1 to 2 days with a thickness of 0.2 mm, and in one day with a thickness of 3.6 mm.

As has been described in the foregoing, as the silicon carbide material according to the present invention is used either recrystallization or silicon-nitride-bond silicon carbide, which is superior in the thermal conductivity, heat resistance and thermal response as the silicon carbide material and in which the $Si+SiO_2$ content is limited. Thus, the material can be effectively used as an excellently corrosion-proof material for low-melting fusion metals. Further, by forming a vapor phase growth film and/or a corrosion-proof heat insulating coating layer, a material for low-melting point fusion metals, which has increased corrosion resistance and spalling resistance, is free from generation of cracks and can be easily maintained and has long life, can be obtained.

We claim:

1. A silicon carbide material for low-melting point fusion metal, comprising a body of recrystallization silicon carbide or silicon nitride coupled silicon carbide, containing a total content of free silicon and silicon oxide of less than 5% by weight and coating the surface of said body is a film of vapor phase growth silicon carbide or silicon nitride, wherein a corrosion-resistance heat insulating coating is provided on at least a portion of said film, which is contacted directly with the fused metal.

2. A silicon carbide material as claimed in claim 1, wherein said vapor phase growth film has a thickness ranging between 0.1 to 2 mm.

3. A silicon carbide material as claimed in claim 1, wherein said corrosion-resistance heat insulating coating is silicon nitride and boron nitride.

4. A silicon carbide material as claimed in claim 3, wherein the thickness of the coating layer ranges between 0.3 and 3.5 mm.

5. A silicon carbide material as claimed in claim 1, wherein said corrosion resistance heat insulating coating is silicon nitride.

6. A silicon carbide material as claimed in claim 1, wherein said corrosion resistance heat insulating coating is boron nitride.

7. A silicon carbide material as claimed in either claim 3, 5 or 6, wherein said coating layer has a multi-layer structure comprising at least two layers.

8. A silicon carbide material as claimed in claim 7, wherein the thickness of the coating layer ranges between 0.3 and 3.5 mm.

* * * * *